(12) United States Patent
Hershman

(10) Patent No.: US 10,013,581 B2
(45) Date of Patent: Jul. 3, 2018

(54) DETECTION OF FAULT INJECTION ATTACKS

(71) Applicant: Nuvoton Technology Corporation, Hsin-chu (TW)

(72) Inventor: Ziv Hershman, Givat Shmuel (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 437 days.

(21) Appl. No.: 14/507,867

(22) Filed: Oct. 7, 2014

(65) Prior Publication Data

US 2016/0098333 A1   Apr. 7, 2016

(51) Int. Cl.
*G06F 21/00* (2013.01)
*G06F 21/75* (2013.01)

(52) U.S. Cl.
CPC ................... *G06F 21/75* (2013.01)

(58) Field of Classification Search
CPC ....................................... G06F 21/75
USPC ........................................ 726/26–30
See application file for complete search history.

(56) References Cited

U.S. PATENT DOCUMENTS

| | | | |
|---|---|---|---|
| 4,860,288 A | 8/1989 | Teske et al. | |
| 5,867,409 A | 2/1999 | Nozuyama | |
| 6,385,176 B1* | 5/2002 | Iyengar | H04B 3/23 370/286 |
| 6,735,732 B2 | 5/2004 | Yamada | |
| 6,844,761 B2 | 1/2005 | Byun et al. | |
| 7,702,992 B2 | 4/2010 | Ogawa | |
| 7,770,049 B1 | 8/2010 | Searles et al. | |
| 8,542,177 B2 | 9/2013 | Lee | |
| 2005/0235179 A1 | 10/2005 | Pistoulet | |
| 2007/0075746 A1 | 4/2007 | Fruhauf et al. | |
| 2008/0284483 A1 | 11/2008 | Nakashima | |
| 2009/0315603 A1 | 12/2009 | Bancel et al. | |
| 2010/0026358 A1* | 2/2010 | Bancel | G06F 21/75 327/202 |

(Continued)

FOREIGN PATENT DOCUMENTS

| | | |
|---|---|---|
| CN | 101192820 A | 6/2010 |
| KR | 101352149 B1 | 1/2014 |

OTHER PUBLICATIONS

U.S. Appl. No. 14/308,723 Office Action dated Jun. 4, 2015.

(Continued)

*Primary Examiner* — Anthony Brown
(74) *Attorney, Agent, or Firm* — D. Kligler IP Services Ltd.

(57) ABSTRACT

An apparatus for detecting fault injection includes functional circuitry and fault detection circuitry. The functional circuitry is configured to receive one or more functional input signals and to process the functional input signals so as to produce one or more functional output signals. The functional circuitry meets a stability condition that specifies that stability of a designated set of one or more of the functional input signals during a first time interval guarantees stability of a designated set of one or more of the functional output signals during a second time interval that is derived from the first time interval. The fault detection circuitry is configured to monitor the designated functional input and output signals, to evaluate the stability condition based on the monitored functional input and output signals, and to detect a fault injection attempt in response to detecting a deviation from the stability condition.

16 Claims, 3 Drawing Sheets

(56) References Cited

U.S. PATENT DOCUMENTS

| | | |
|---|---|---|
| 2011/0029828 A1 | 2/2011 | Bancel et al. |
| 2011/0234307 A1 | 9/2011 | Marinet et al. |
| 2013/0061104 A1* | 3/2013 | Hartl .............. G01R 31/318357 |
| | | 714/741 |
| 2013/0099844 A1 | 4/2013 | Kawaoka |
| 2013/0113572 A1 | 5/2013 | Sharda et al. |
| 2013/0305078 A1 | 11/2013 | Lee et al. |
| 2014/0075255 A1 | 3/2014 | Lee et al. |
| 2014/0219406 A1 | 8/2014 | Chen et al. |
| 2015/0121327 A1 | 4/2015 | Kamal et al. |
| 2015/0269298 A1 | 9/2015 | Dai et al. |
| 2015/0280722 A1 | 10/2015 | Liu et al. |
| 2015/0323959 A1 | 11/2015 | Arabi |
| 2016/0028381 A1 | 1/2016 | Tasher |
| 2016/0028394 A1 | 1/2016 | Tasher et al. |

OTHER PUBLICATIONS

TW Application # 103140005 Office Action dated Nov. 25, 2015.
European Application # 14179703.5 Search Report dated Feb. 13, 2015.
U.S. Appl. No. 14/337,257 Office Action dated Feb. 22, 2016.
U.S. Appl. No. 14/752,944 Office Action dated Dec. 9, 2015.
U.S. Appl. No. 14/752,944 Office Action dated Mar. 16, 2016.
Hershman et al, U.S. Appl. No. 14/308,723 dated Jun. 19, 2014.

* cited by examiner

DETECTION OF FAULT INJECTION ATTACKS

FIELD OF THE INVENTION

The present invention relates generally to protection of electronic circuitry, and particularly to methods and systems for detecting fault injection attacks.

BACKGROUND OF THE INVENTION

Fault injection attacks are a family of techniques used for accessing, analyzing or extracting information from secure electronic circuitry, such as cryptographic circuitry. A fault injection attack typically involves causing a fault in the circuit, e.g., by physically contacting signal lines, by applying high-power laser or electromagnetic pulses, or by causing glitches on power supply or other external interfaces. The fault is expected to cause the circuit to output sensitive information, or otherwise assist the attacker in penetrating the circuit or the information it stores.

Various techniques for detecting and mitigating fault injection attacks are known in the art. For example, U.S. Patent Application Publication 2011/0029828, whose disclosure is incorporated herein by reference, describes a circuit for detecting a fault injection in an integrated circuit. The circuit includes at least one logic block for performing a logic function of the integrated circuit; an isolation block coupled to receive a signal to be processed and an isolation enable signal indicating a functional phase and a detection phase of the logic block. The isolation block applies, during the functional phase, the signal to be processed to at least one input of the logic block, and during the detection phase, a constant value to the input of the logic block. A detection block is adapted to monitor, during the detection phase, the state of the output signal of the logic block, and to generate an alert signal in case of any change in the state of the output signal.

U.S. Patent Application Publication 2007/0075746, whose disclosure is incorporated herein by reference, describes techniques for glitch detection in a secure microcontroller. An apparatus includes a plurality of macro-cells formed from logic capable of performing one or more functions. The apparatus also includes a clock tree capable of receiving a clock signal and providing at least one copy of the clock signal to each macro-cell. The clock tree includes a local branch within each macro-cell, where each local branch is capable of providing at least one copy of the clock signal. In addition, the apparatus includes at least one glitch detection circuit capable of detecting a glitch in one or more copies of the clock signal provided by the local branches in the macro-cells.

U.S. Patent Application Publication 2009/0315603, whose disclosure is incorporated herein by reference, describes techniques for detecting a disturbance of a state of at least one first flip-flop from a group of several first flip-flops of an electronic circuit. The respective outputs of the first flip-flops in the group are, independently from their functional purpose, combined to provide a signal and its inverse, triggering two second flip-flops having data inputs forced to a same state, the respective outputs of the second flip-flops being combined to provide the result of the detection. A pulse signal comprising a pulse at least for each triggering edge of one of the first flip-flops in the group initializes the second flip-flops.

U.S. Patent Application Publication 2005/0235179, whose disclosure is incorporated herein by reference, describes a device for protection against error injection into a synchronous flip-flop of an elementary logic module. A logic circuit comprises a logic module comprising a functional synchronous flip-flop receiving a functional result comprising several bits in parallel, and supplying a synchronous result. A module for checking the integrity of the functional flip-flop comprises a first coding block receiving the functional result and supplying a first code, a second coding block receiving the synchronous result and supplying a second code, a checking synchronous flip-flop receiving the first code and supplying a third code, and a comparator for comparing the second code with the third code and for supplying a first error signal.

Korean Patent Application Publication KR101352149B, whose disclosure is incorporated herein by reference, describes a circuit for detecting optical fault injection using a buffer in a reset signal path, capable of detecting optical fault injection using buffers existing in a reset signal line required for resetting a chip. The circuit includes a plurality of detection units formed in a path of a reset signal which is transmitted to each flip-flop comprising a digital circuit for detecting external optical fault injection, a signal collection unit for collecting outputs of the detection units into one and distinguishing a change when a change in signals of any of the detection units is occurred, and a detection signal generation unit for detecting a signal change outputted from the detection units and generating an optical fault injection detection signal by an input of the signal collection unit.

SUMMARY OF THE INVENTION

An embodiment of the present invention that is described herein provides an apparatus for detecting fault injection, including functional circuitry and fault detection circuitry. The functional circuitry is configured to receive one or more functional input signals and to process the functional input signals so as to produce one or more functional output signals. The functional circuitry meets a stability condition that specifies that stability of a designated set of one or more of the functional input signals during a first time interval guarantees stability of a designated set of one or more of the functional output signals during a second time interval that is derived from the first time interval. The fault detection circuitry is configured to monitor the designated functional input and output signals, to evaluate the stability condition based on the monitored functional input and output signals, and to detect a fault injection attempt in response to detecting a deviation from the stability condition.

In some embodiments, the fault detection circuitry is configured to detect the fault injection attempt during normal functional operation of the functional circuitry. In an embodiment, the fault detection circuitry is configured to evaluate the stability condition based on only a partial subset of the functional output signals of the functional circuitry. In another embodiment, the fault detection circuitry is configured to evaluate the stability condition based on only a partial subset of the functional input signals of the functional circuitry.

In a disclosed embodiment, the fault detection circuitry is configured to detect the fault injection attempt by detecting a change of logic level in at least one of the designated functional output signals during the second time interval, while the designated functional input signals are stable throughout the first time interval. In another embodiment, the functional circuitry includes sampled-state circuitry that is clocked by a clock signal, and the fault detection circuitry is configured to evaluate the stability condition based only on changes in the designated functional output signals that are sampled by the clock signal. Additionally or alternatively, the functional circuitry includes sampled-state circuitry that is clocked by a clock signal, and the fault detection circuitry is configured to evaluate the stability condition based only on changes in the designated functional input signals that are sampled by the clock signal.

There is additionally provided, in accordance with an embodiment of the present invention, a method for detecting fault injection, including processing one or more functional input signals using functional circuitry so as to produce one or more functional output signals, wherein the functional circuitry meets a stability condition that specifies that stability of a designated set of one or more of the functional input signals during a first time interval guarantees stability of a designated set of one or more of the functional output signals during a second time interval that is derived from the first time interval. The designated functional input and output signals are monitored, and the stability condition is evaluated based on the monitored functional input and output signals. A fault injection attempt is detected in response to detecting a deviation from the stability condition.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for detecting and mitigating fault injection attacks on Integrated Circuits (ICs). The disclosed techniques reuse existing functional circuitry of the IC for detecting fault injection attacks.

To qualify for this dual role, the functional circuitry should meet a "Finite Impulse Response" (FIR) condition that is specified with respect to its functional input signals and functional output signals (also referred to herein as functional inputs and functional outputs for brevity). In the present context, the functional circuitry meets the FIR condition if stability of a designated set of (one or more of) the functional inputs during a first time interval guarantees stability of a designated set of (one or more of) the functional outputs during a second time interval that is derived from the first time interval. The term "guaranteed stability" assumes that the circuitry is operated within its specified operating conditions and that no attack attempt is made.

The stability duration of the designated set of the functional inputs relating to the first time interval in the definition above is also referred to as an input stability interval, and the resulting stability duration of the designated set of the functional outputs relating to the second time interval in the definition above is also referred to as an output stability interval. The input and output stability intervals may be finite, infinite and/or made-up of multiple intervals.

When the functional circuitry meets the FIR condition, any deviation from the FIR property (i.e., a designated functional output that is unstable during the output stability interval) is unexpected, and may be indicative of a fault injection attempt.

In some embodiments, the IC comprises fault detection circuitry that monitors the designated set of the functional inputs and the designated set of the functional outputs of the functional circuitry. Upon detecting an unexpected deviation from the FIR condition, the fault detection circuitry declares a possible fault injection attempt. The fault detection circuitry may then trigger an alert or initiate some protective action.

The disclosed techniques check for fault detection attacks during normal operation of the IC, rather than entering a dedicated fault detection state. Moreover, the methods and systems described herein detect fault injection using existing functional hardware of the IC. As such, fault injection may be detected over large portions of the IC without requiring substantial addition of hardware.

System Description

Figure 1:
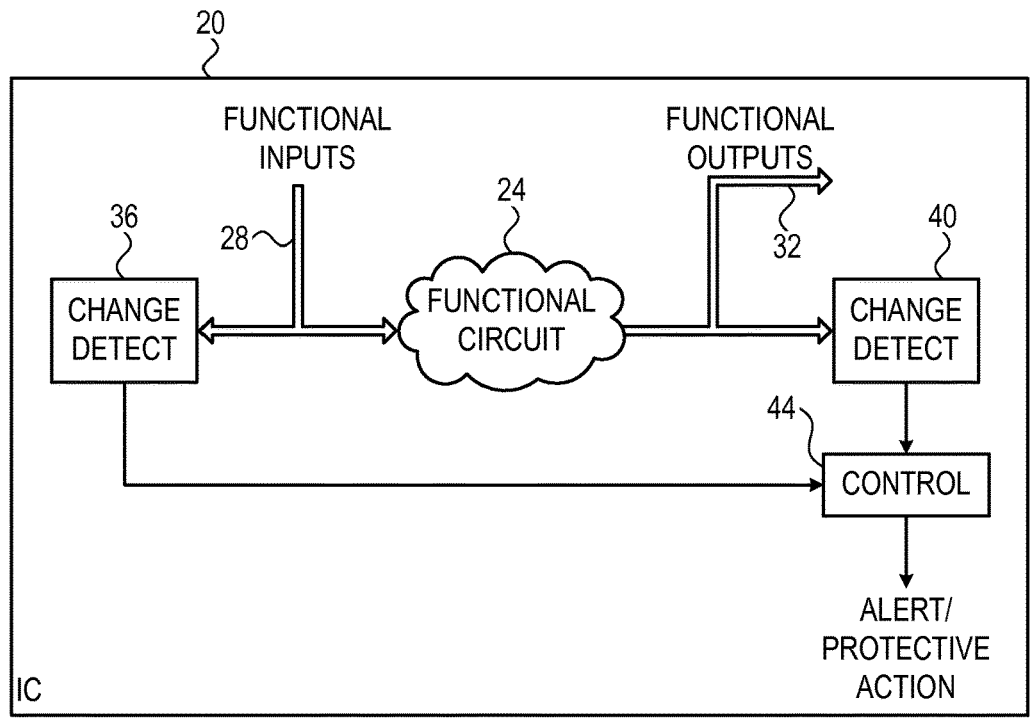
FIG. 1 is a block diagram that schematically illustrates a secure Integrated Circuit (IC), in accordance with an embodiment of the present invention.

FIG. 1 is a block diagram that schematically illustrates elements of a secure Integrated Circuit (IC) 20, in accordance with an embodiment of the present invention. IC 20 may comprise, for example, a microprocessor, a memory device or any other suitable type of IC.

IC 20 comprises certain functional circuitry 24, which performs some functional task in the IC, and in addition serves for detecting fault injection attempts. Circuitry 24 may comprise, for example, combinatorial logic, Flip-Flops (FFs), a register bank, a Floating-Point Unit (FPU), a Flash memory interface unit, a security accelerator, debugging circuitry, a General-Purpose Input-Output (GPIO) controller, glue logic, a portion of the mentioned elements and/or any other suitable types of circuit elements.

In some embodiments, circuitry 24 spans a large portion of the area of IC 20, in order to increase the probability of successful fault injection detection. In other embodiments, the IC comprises multiple functional circuits such as circuit 24, each satisfying the FIR condition with respective designated sets of functional inputs and outputs, and each used for detecting fault injection in a certain portion of the IC. Functional circuit(s) 24 may be selected and defined, for example, at or near sensitive locations in the IC in which protection is most desired. IC 20 typically comprises additional functional hardware other than circuitry 24. This additional circuitry is not shown in the figure for the sake of clarity.

During normal operation of the IC, circuitry 24 receives one or more functional input signals 28, and processes the functional input signals so as to produce one or more functional out signals 32. Any desired numbers of functional input and output signals can be used.

Functional circuitry 24 meets the FIR condition defined above. Thus, for a designated set of (one or more) functional inputs 28 and a designated set of (one or more) functional outputs 32, stability of the designated functional inputs during a first time interval (input stability interval) guarantees (assuming the circuitry is operated within its specified operating conditions and that no attack attempt is made) stability of the designated functional outputs during a second time interval (output stability interval) that is derived from the first time interval.

For example, when functional circuit 24 comprises only combinatorial logic, then the input stability interval is the same as the output stability interval. If, on the other hand, functional circuit 24 comprises some delay elements (e.g. flip-flops), then the output stability interval may differ from the input stability interval.

Figure 3:
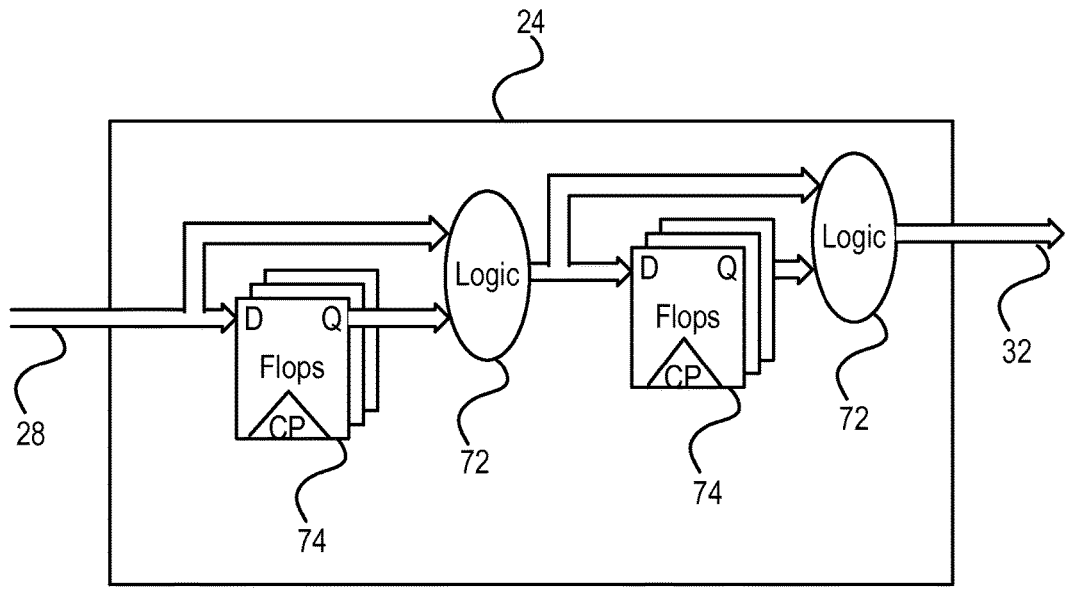
FIG. 3 is a block diagram that schematically illustrates a functional circuit that is a part of an IC, in accordance with an embodiment of the present invention.
Figure 5:
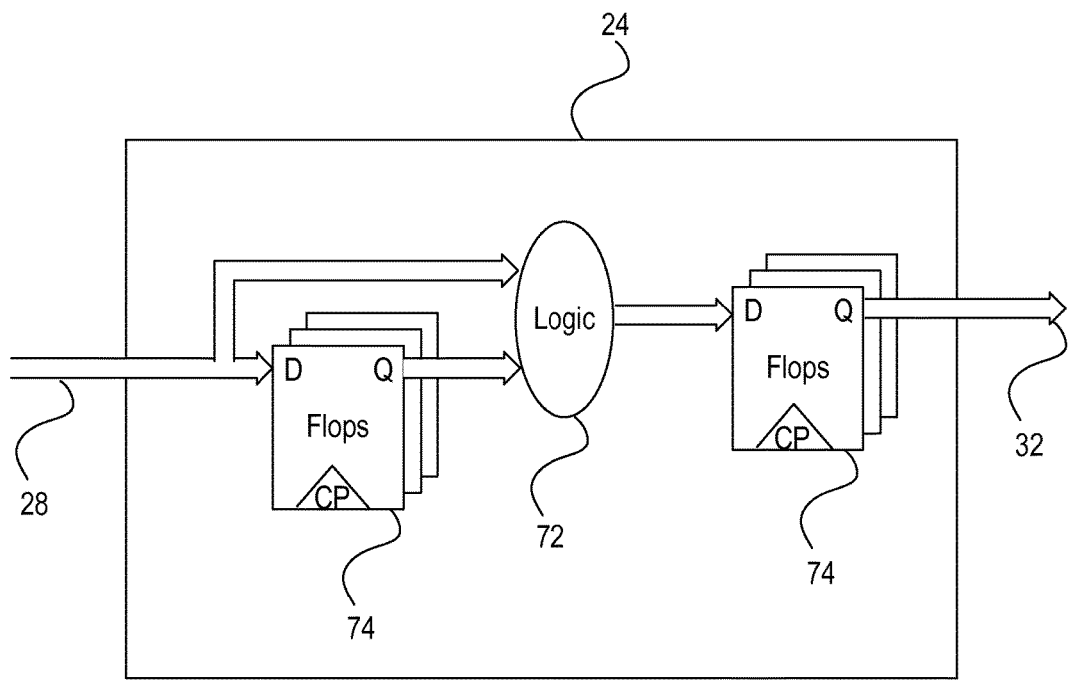
FIG. 5 is a block diagram that schematically illustrates a functional circuit that is a part of an IC, in accordance with another embodiment of the present invention.

FIGS. 3 and 5 are block diagrams that schematically illustrate examples of functional circuit 24, in accordance with embodiments of the present invention. In both figures, circuit 24 comprises combinatorial logic 72 and sequential elements (e.g. Flip-flops) 74.

Figure 4:
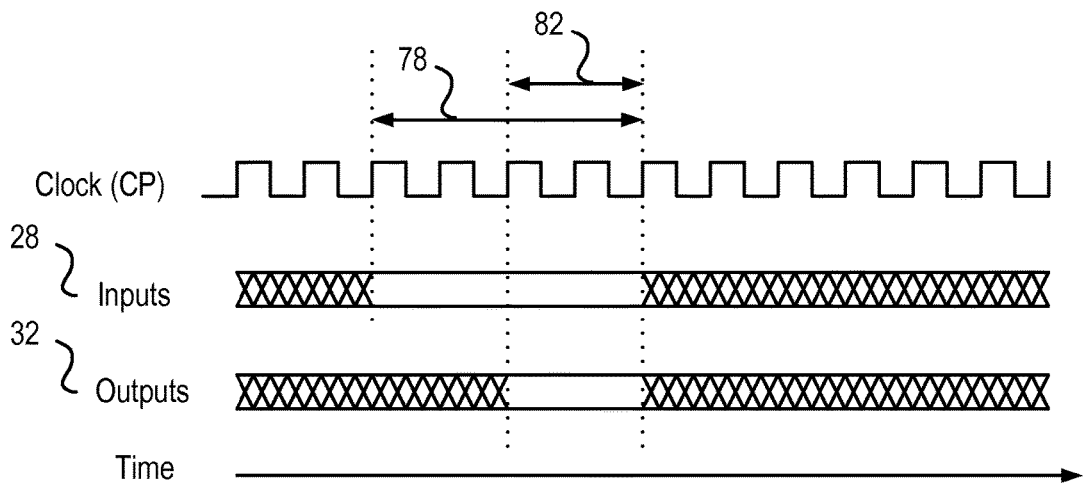
FIG. 4 is a timing diagram that schematically illustrates the relation between input and output stability time of the functional circuit of FIG. 3, in accordance with an embodiment of the present invention.
Figure 6:
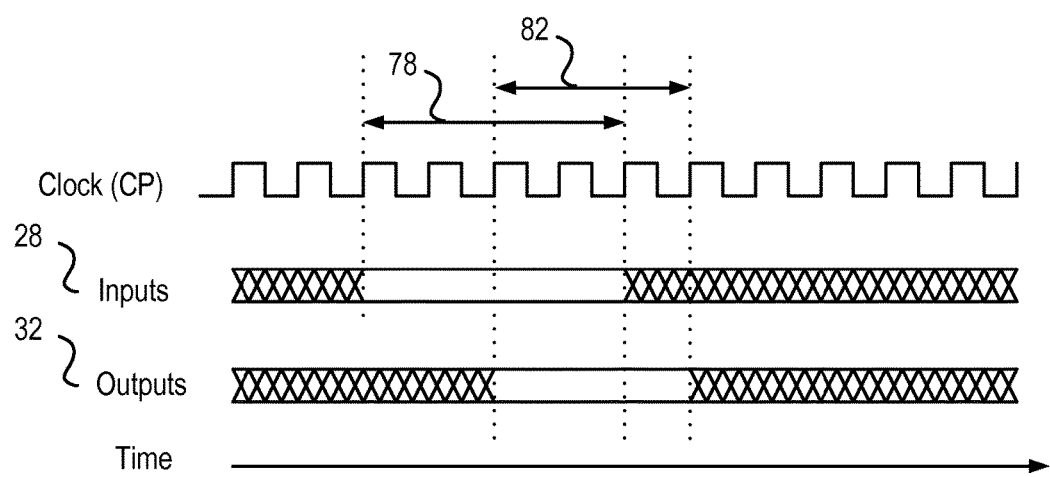
FIG. 6 is a timing diagram that schematically illustrates the relation between input and output stability time of the functional circuit of FIG. 5, in accordance with an embodiment of the present invention.

FIGS. 4 and 6 are timing diagrams that schematically illustrate the relation between input and output stability times of the functional circuits of FIGS. 3 and 5, respectively, in accordance with an embodiment of the present invention. Both figures show the clock signal (CP) that clock flip-flops 74, functional input signals 28, and functional output signals 32, as a function of time. Input stability interval 78 and output stability interval 82 are also shown.

In some embodiments, the output stability interval begins one or more clock cycles after the input stability interval begins, but ends at the same clock cycle as the input stability interval. This may occur, for example, if the relevant functional outputs have both combinatorial and sequential paths (pass through flip-flops) from the corresponding functional inputs. Such a configuration is demonstrated in FIGS. 3 and 4.

In other embodiments, the output stability interval begins one or more clock cycles after the input stability interval begins, and ends one or more clock cycles after the input stability interval ends. This may occur, for example, if all paths from the relevant functional inputs to the corresponding functional outputs are sequential (e.g., each path pass through at least one flip-flop). Such a configuration is demonstrated in FIGS. 5 and 6.

The input and output stability intervals are typically measured and expressed in clock cycles. Each of the input and output stability intervals may be finite, infinite, or may comprise multiple disjoint intervals. Any suitable interval sizes can be used.

In some embodiments, the term "stable," referring to a functional input or output signal, means that the signal remains at a certain fixed logical level (zero or otherwise). Instability in such a signal is defined as a change from the fixed logical level. In combinatorial functional circuitry, typically any change in signal level of the designated functional inputs and outputs is regarded as instability. This use case is suitable, for example, when there exists a combinatorial relation between the functional input and the outputs. In sampled-state functional circuitry (also referred to as sequential elements, e.g., flip-flops) that is clocked by a clock signal, on the other hand, instability typically refers only to signal-level changes that are designated to be sampled by the clock signal. In such an embodiment, the fault detection circuitry may only consider a functional input instability if the change in signal was sampled by the circuit clock (e.g., by sampling the input lines). This use case is suitable, for example, when there is no combinatorial relation between the functional input and the outputs, for example as in the embodiment of FIG. 5 and FIG. 6. In some other cases, it may be desirable to have the fault detection circuitry consider changes in both functional inputs and outputs only if sampled. Such approach may be useful, for example, in the embodiment of FIG. 5 and FIG. 6 where both combinatorial and sequential (sampled) paths exist from functional inputs to functional outputs.

In some embodiments, IC 20 comprises fault detection circuitry that monitors one or more of the functional input signals and one or more of the functional output signals of functional circuitry 24, and detects possible fault injection attempts. Note that the fault detection process is carried out during normal functional operation of IC 20, and using the same functional input and output signals used during normal operation.

Various types of fault injection attacks can be identified in this manner, e.g., attacks conducted by physically contacting a line in functional circuitry 24, by applying an electromagnetic field to the IC, by applying laser pulses, by applying a disturbance to a power supply line or other external interface of the IC, or any other suitable kind of fault injection attack. Any such action is meant to cause a glitch or disturbance on one or more of the lines in IC 20.

In the example of FIG. 1, the fault detection circuitry comprises change detection units 36 and 40, and a control unit 44. Change detection unit 36 monitors one or more of functional input signals 28, and indicates whether the monitored functional input signals are stable or not. Change detection unit 40 similarly monitors one or more of functional output signals 32, and indicates whether or not the monitored functional output signals are stable.

Each of the change detection units may detect changes on each signal separately, or jointly on a group of signals such as using a XOR function that consolidates the signals before the change detection. The latter approach may miss a change if two signals change simultaneously, but it may be more economical in terms of gate-count and therefore in area.

Based on the outputs of change detection units 36 and 40, control unit 44 checks whether an unexpected instability occurs on one or more of functional output signals 32. Typically, control unit 44 is preconfigured with the known input and output stability intervals of circuitry 24. Using this information, control unit 44 is able to check whether functional outputs 32 stabilize and remain stable according to the FIR condition. If multiple functional circuits 24 are used, each functional circuit 24 may be coupled to respective change detection units 36 and 40, whose outputs are all provided to control unit 44. The control unit is thus able to detect fault injection attempts in any of the multiple functional circuits.

As explained above, control unit 44 may check for unexpected instability in only a partial subset of the functional output signals. Additionally or alternatively, control unit 44 may check for unexpected instability relative to only a partial subset of the functional input signals.

In response to detecting an unexpected instability in functional output signals 32, control unit 44 may trigger an alert and/or take any suitable protective action. Protective action may comprise, for example, shutting down some or all of IC 20, retaining at least part of the IC in a reset condition, or deleting certain information stored on IC 20.

The IC configuration of FIG. 1 is an example configuration, which is shown purely for the sake of conceptual clarity. In alternative embodiments, any other suitable IC configuration can also be used. Elements that are not necessary for understanding the principles of the present invention, such as various interfaces, control circuits, addressing circuits, timing and sequencing circuits and debugging circuits, have been omitted from the figure for clarity. The various IC elements may be implemented in hardware, in software, or using a combination of hardware or software elements.

In some embodiments, control unit 44 is implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Fault Detection Method Description

Figure 2:
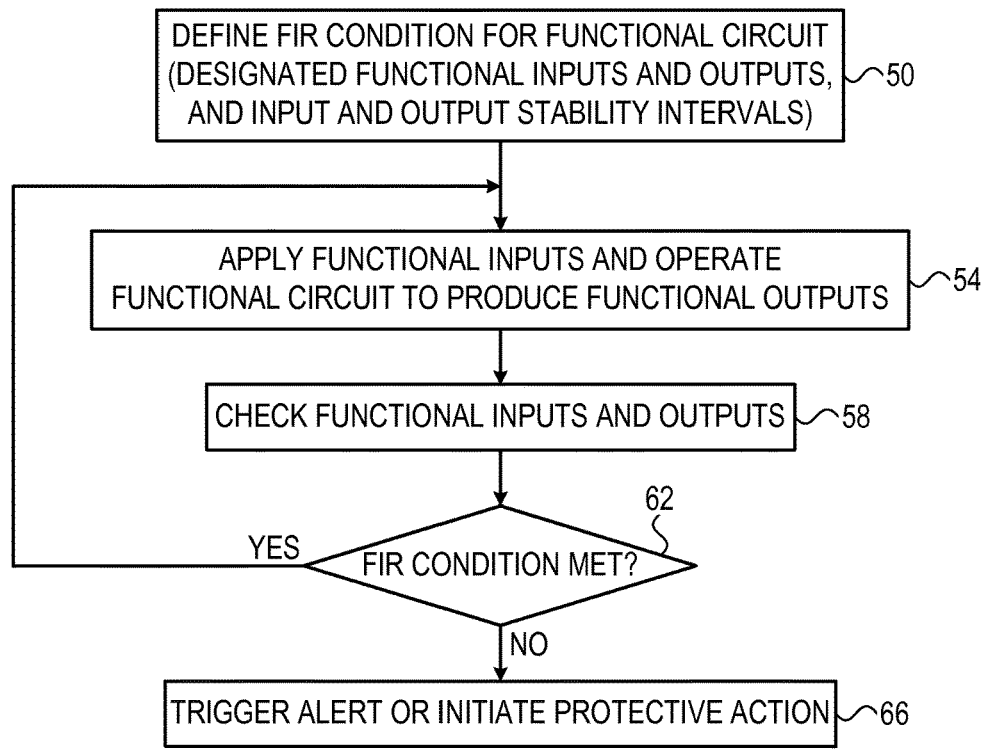
FIG. 2 is a flow chart that schematically illustrates a method for detecting fault injection, in accordance with an embodiment of the present invention.

FIG. 2 is a flow chart that schematically illustrates a method for detecting fault injection, in accordance with an embodiment of the present invention. The method begins by defining the FIR condition for functional circuitry 24 (including designated functional inputs and outputs, and input and output stability intervals), at a FIR condition definition step 50.

At a normal operation step 54, functional circuitry 24 operates on functional inputs 28 so as to produce functional outputs 32. At a checking step 58, the fault detection circuitry checks for unexpected instability on functional outputs 32 that violates the FIR condition.

If the FIR condition is maintained, the method loops back to step 54. Otherwise, the fault detection circuitry triggers an alert and/or takes protective action, at a fault detection step 66.

Although the embodiments described herein mainly address protection against fault injection in an IC, the methods and systems described herein can also be used in other applications, such as in fault injection detection in distributed circuits, e.g., by monitoring interconnecting signals on a circuit board, and for functional failure detection in both distributed and integrated circuits.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
hardware-implemented functional circuitry, which is configured to receive at least a functional input signal and to process the functional input signal so as to produce at least a functional output signal; and
a hardware-implemented fault detection processor, which is configured to:
monitor the functional input signal and the functional output signal; and
detect a fault injection attempt by identifying that, even though the functional input signal is stable during a first time interval, the functional output signal is unstable during a second time interval derived from the first time interval.

2. The IC according to claim 1, wherein the fault detection processor is configured to detect the fault injection attempt during normal functional operation of the functional circuitry.

3. The IC according to claim 1, wherein the at least one functional output signal comprises multiple functional output signals, and wherein the fault detection processor is configured to detect the fault injection attempt based on only a partial subset of the functional output signals of the functional circuitry.

4. The IC according to claim 1, wherein the at least one functional input signal comprises multiple functional input signals, and wherein the fault detection processor is configured to detect the fault injection attempt based on only a partial subset of the functional input signals of the functional circuitry.

5. The IC according to claim 1, wherein the fault detection processor is configured to detect the fault injection attempt by detecting a change of logic level in the functional output signal during the second time interval, while the functional input signal is stable throughout the first time interval.

6. The IC according to claim 1, wherein the functional circuitry comprises sampled-state circuitry that is clocked by a clock signal, and wherein the fault detection processor is configured to detect the fault injection attempt based only on changes in the functional output signal that are sampled by the clock signal.

7. The IC according to claim 1, wherein the functional circuitry comprises sampled-state circuitry that is clocked by a clock signal, and wherein the fault detection processor is configured to detect the fault injection attempt based only on changes in the functional input signal that are sampled by the clock signal.

8. A method for detecting fault injection, comprising:
processing at least a functional input signal by hardware-implemented functional circuitry in an Integrated Circuit (IC), so as to produce at least a functional output signal;
monitoring the functional input signal and the functional output signal using a hardware-implemented fault detection processor in the IC; and
detecting a fault injection attempt, using the hardware-implemented fault detection processor in the IC, by identifying that even though the functional input signal is stable during a first time interval, the functional output signal is unstable during a second time interval derived from the first time interval.

9. The method according to claim 8, wherein detecting the fault injection attempt is performed during normal functional operation of the functional circuitry.

10. The method according to claim 8, wherein the at least one functional output signal comprises multiple functional output signals, and wherein detecting the fault injection attempt is performed based on only a partial subset of the functional output signals of the functional circuitry.

11. The method according to claim 8, wherein the at least one functional input signal comprises multiple functional input signals, and wherein detecting the fault injection attempt is performed based on only a partial subset of the functional input signals of the functional circuitry.

12. The method according to claim 8, wherein detecting the fault injection attempt comprises detecting a change of logic level in the functional output signal during the second time interval, while the functional input signal is stable throughout the first time interval.

13. The method according to claim 8, wherein the functional circuitry comprises sampled-state circuitry that is clocked by a clock signal, and wherein detecting the fault injection attempt is performed based only on changes in the functional output signal that are sampled by the clock signal.

14. The method according to claim 8, wherein the functional circuitry comprises sampled-state circuitry that is clocked by a clock signal, and wherein detecting the fault injection attempt is performed based only on changes in the functional input signal that are sampled by the clock signal.

15. The IC according to claim 1, wherein a time difference between the second time interval and the first time interval depends on a structure of the functional circuitry.

16. The method according to claim 8, wherein a time difference between the second time interval and the first time interval depends on a structure of the functional circuitry.

\* \* \* \* \*